Patented Oct. 1, 1929

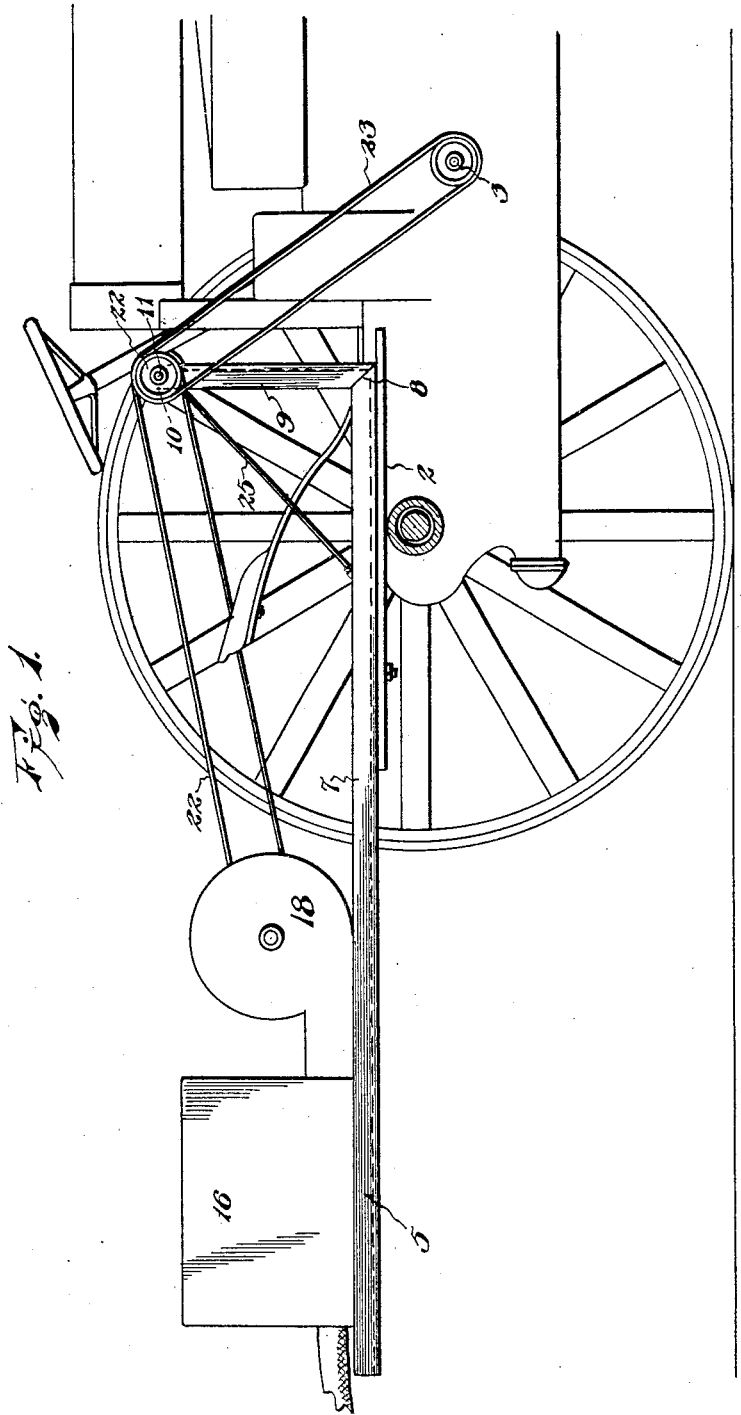

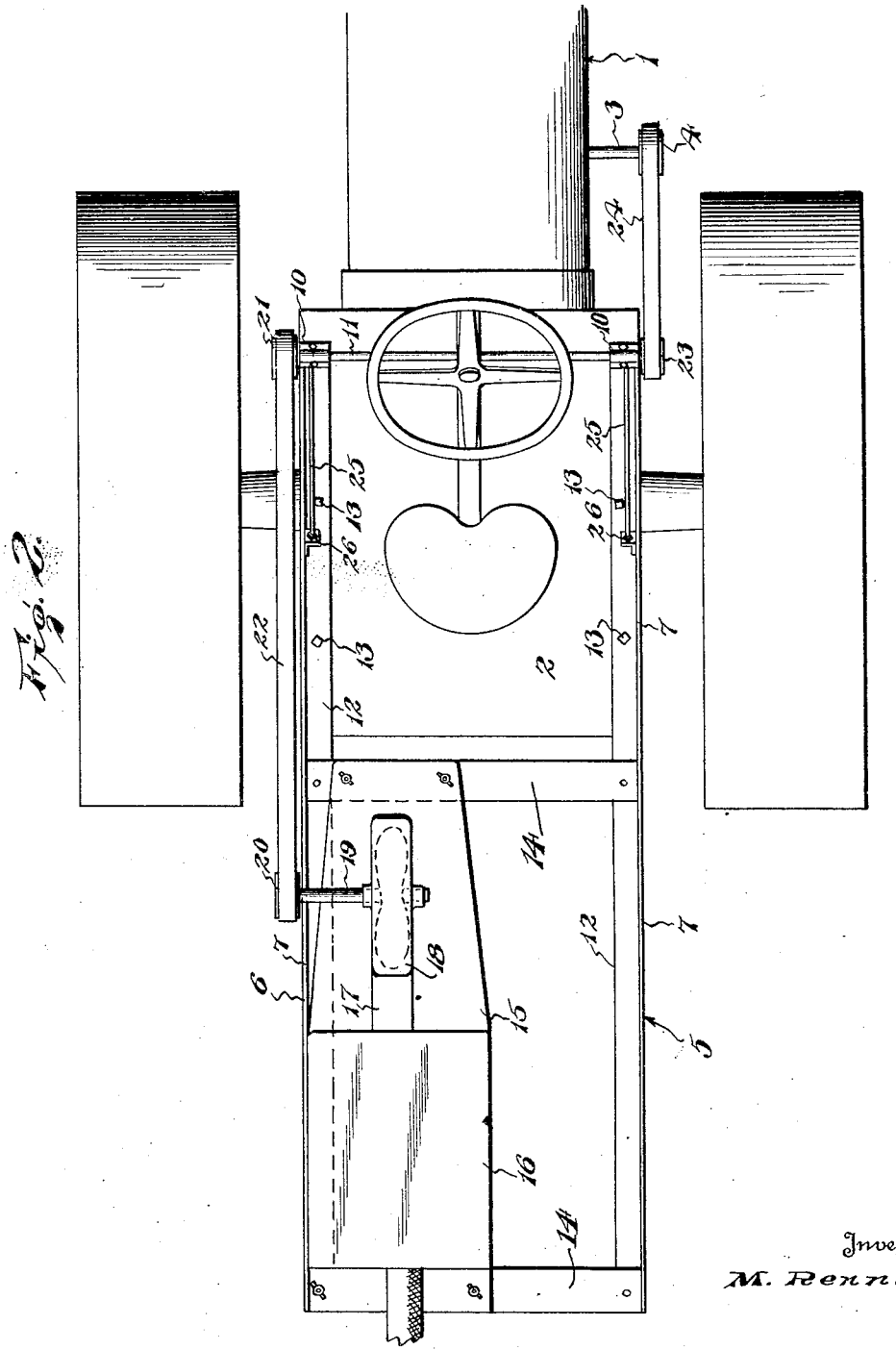

1,729,686

UNITED STATES PATENT OFFICE

MAX RENNER, OF JASPER, INDIANA

TRACTOR ATTACHMENT

Application filed August 24, 1927. Serial No. 215,212.

The present invention is directed to improvements in attachments for tractors.

The primary object of the invention is to provide an attachment so constructed that it can be conveniently secured to the platform of the tractor and supported in such manner that a dust hopper can be conveniently carried upon the tractor.

Another object of the invention is to provide an attachment of this nature wherein the dust hopper is driven from the power take-off shaft of the tractor.

Another object of the invention is to provide an attachment so constructed that it can be effectively secured to the tractor and properly supported without the aid of wheels.

In the accompanying drawing:

Figure 1 is a side elevation of the device, showing it in place upon a tractor, one of the tractor wheels being removed.

Figure 2 is a top plan view of the attachment showing it in place upon a tractor.

Referring to the drawing, 1 designates a portion of a tractor of any standard make, 2 the platform thereof, and 3 the power take-off shaft, which is provided with a belt pulley 4.

The attachment comprises a frame 5 which consists of a pair of side bars 6 formed from angle iron. These bars have their vertical webs 7, cut as at 8, in order that the forward ends thereof may be bent upwardly to provide uprights 9 which have their upper ends provided with bearings 10 in which is journaled a counter-shaft 11, the purpose of which will be later explained.

The horizontal bars 12 of the webs 7 are secured to the platform 2 by bolts 13, or in any other manner desired. The side bars are maintained in spaced relation by wooden cross sills 14, one at the rear end thereof, and the other intermediate the ends, said sills also serving to support the base plate 15 upon which the dust containing hopper 16 is mounted, wind being conducted to the hopper through the pipe 17 leading from the fan casing 18, the fan shaft 19 having a pulley 20 which is alined with the pulley 21 carried by one end of the countershaft 11, there being a belt 22 connecting said pulleys. The other end of the shaft 11 carries a pulley 23 which is connected to the pulley 4 of the power take-off shaft 3 by a belt 24.

To properly hold the uprights 9 against bending tie rods 25 are provided and have their upper ends connected to the bearing 10 and their lower ends adjustably secured in the brackets 26 carried by the vertical webs 7 of the side bars.

It will be observed that the dust hopper is sustained above the ground and without the aid of wheels, as in the case of a trailer, thus providing an attachment which can be used over rough ground or ditches without danger of dislodgement.

When the tractor is in motion the belt 24 will drive the counter-shaft 11, thus actuating the fan shaft 19 through the medium of the pulleys 21 and 20 and belt 22, thus forcing air into the hopper for driving the dust from the hopper upon the plants as the tractor moves over the field.

Having thus described the invention, I claim:

In combination with the platform of a tractor, a frame consisting of side bars, said side bars being formed from angle iron, the vertical webs of the side bars being cut adjacent their forward ends to permit the forward ends to be bent upwardly to provide uprights, tie bars connecting the uprights and side bars, bearings carried by the uprights, a counter shaft journaled in the bearing, a dust containing hopper supported by the frame, a fan casing having communication with the hopper, and means for driving the counter shaft from the power take-off shaft of the tractor, and thus the fan within said casing, as and for the purpose set forth.

In testimony whereof I affix my signature.

MAX RENNER. [L. S.]